United States Patent [19]

Ingouf et al.

[11] Patent Number: 4,770,882

[45] Date of Patent: Sep. 13, 1988

[54] PREPARATION OF PRESSED CURD CHEESES

[75] Inventors: Jean-Claude Ingouf, Saint-Lo; Claude Parmantier, Pont-Hebert; Alain Verney, Saint-Lo, all of France

[73] Assignee: Nestec S. A., Vevey, Switzerland

[21] Appl. No.: 941,857

[22] Filed: Dec. 15, 1986

[30] Foreign Application Priority Data

Dec. 30, 1985 [FR] France ................................ 8519400

[51] Int. Cl.$^4$ ..................... A23C 19/032; A23C 19/16
[52] U.S. Cl. ........................................ 426/36; 426/40; 426/582; 426/125; 426/130
[58] Field of Search ...................... 426/34, 36, 37, 38, 426/39, 40, 42, 43, 61, 580, 582, 657, 491, 512, 125, 130; 435/853–857

[56] References Cited

U.S. PATENT DOCUMENTS 3,078,170  2/1963  Leber .................................... 426/36
4,020,185  4/1977  Andersen et al. .................... 426/61
4,402,986  9/1983  Sinkoff et al. ....................... 426/583

OTHER PUBLICATIONS

Prescott & Dann's, "Industrial Microbiology", Ed. by Reed; AVI Publ. Co., Inc., Westport, CT., pp. 73–74.
Prescott & Dunn's, Industrial Microbiology, (3rd Ed.), Rev. by Dunn, McGraw-Hill, (1959), pp. 313, 393–398.

Primary Examiner—Marianne Cintins
Attorney, Agent, or Firm—Vogt & O'Donnell

[57] ABSTRACT

Pressed curd opened-body cheeses are prepared with lactic ferments including lactobacilli of the species *Lactobacillus fermentum* which are utilized for producing openings in the body of the cheeses. Small wheels of the cheeses may be prepared by, prior to ripening, coating the cheeses with a plastic film which is substantially impermeable to gases, alone or together with a coating layer of paraffin, or the small wheels may be prepared by ripening the cheeses in a chamber having a pressure in excess of atmospheric pressure for preventing gas loss from the cheeses.

9 Claims, No Drawings

PREPARATION OF PRESSED CURD CHEESES

BACKGROUND OF THE INVENTION

This invention relates to pressed curd opened-body cheeses.

Cooked or non-cooked pressed curd cheeses are not opened in body when their dimensions are average; in the case of wheels, for example, their diameter does not exceed 350 mm and their height 150 mm while their weight is no more than about 10 kg. Saint-Paulin, Gouda, Edam and Cantal are mentioned as examples.

Pressed curd cheeses which have undergone regular and developed opening of the body, of the Emmental type, are commercially available, but only in the form of large wheels from 700 to 1000 mm in diameter and from 130 to 250 mm in height and weighing from about 60 to 130 kg. In the case of Emmental, the body is opened by regularly developed propionic fermentation, that is, the propionic bacteria form propionic acid and acetic acid and also carbon dioxide which dissolves in the water of the body to saturation and, when saturation is reached, gas bubbles appear at certain places, producing holes in the body. The propionic fermentation takes place above all by anaerobiosis and away from the crust.

It would be desirable to make available to consumers a pressed curd cheese of average to small dimensions which has organoleptic and body opening characteristics similar to those of Emmental, i.e., a "mini-Emmental". It is easy to see the advantages such a cheese would have in terms of production and distribution costs apart from the attraction of the novelty.

Efforts to achieve this end have been made in various directions:

Technological modifications relating to the pasteurization conditions of the milk, the quantity of rennet used, the extent of lactose removal and the pressing temperature have failed to remedy the lack of openings or holes in the body of the cheese.

Microbiological modifications such as increasing the quantities and the selectivity of the propionic bacteria or the use of other micro-organisms, such as yeasts, for example, have been equally unsuccessful.

Finally, coating the cheeses over 90% of their surface with a thermoformed film of plastics material to keep in the gases, a plug of wax covering the remaining 10% to act as a valve in the event of an increase in volume, only produced cheeses of which the body was opened, but which were completely deformed after ripening for 25 days.

SUMMARY OF THE INVENTION

The process according to the invention enables these difficulties to be overcome by providing pressed curd cheeses of small to medium dimensions having organoleptic qualities and openings or holes in the body without deformation similar to those of Emmental.

In addition, it has been found that it even enables the production of traditional Emmental cheeses to be improved. Thus, a common practice, depending on the season, is to use part of the milk in crude, non-bactofuged form to retain butyric expanding agents in a sufficient number to aid the propionics, of which there is an insufficient number, in opening the wheels. However, this is an uncertain practice and the cheeses obtained often have a pronounced, unwanted butyric tendency. By contrast, the process according to the invention, by permitting controlled opening irrespective of the season, makes it unnecessary to adopt that practice.

Accordingly, the present invention relates to a process for making pressed curd opened-body cheeses in which milk standardized in milk fats is pasteurized, seeded with lactic ferments and rennet to produce a curd and serum, the curd is cut into grains, part of the serum is removed and the curd grains are washed, heated, placed in moulds and pressed in the moulds, after which the cheeses are removed from the moulds, salted and ripened, characterized in that lactobacilli of the species *Lactobacillus fermentum* are added to the milk before renneting in a quantity sufficient to produce openings, that is holes, in the body.

DESCRIPTION OF PREFERRED EMBODIMENT

In the present specification, the term "lactobacilli" applies to the species *Lactobacillus fermentum*.

The starting material used for carrying out the process according to the invention is milk which has been standardized in fats, for example, by addition of cream, to obtain a concentration by weight of from 40 to 55% and preferably of about 50% fats based on dry matter.

The milk is then pasteurized for a few seconds to 30 minutes at 63° to 90° C., for example. Alternatively, the milk may be bactofuged, i.e., the bacteria are eliminated therefrom be centrifuging at the pasteurization temperature.

In the following step, the milk is seeded with typical lactic ferments, preferably in a quantity of about 1% by weight. It is at this stage that lactobacilli of the species *Lactobacillus fermentum* are added.

These lactobacilli are thermophilic and heterofermentative but, unlike propionibacteria, are able to grow both by anaerobiosis and by aerobiosis, i.e. they are less demanding in regard to the anaerobiosis conditions. They may be cultured on an MRS-BOUILLON medium (MERCK) or advantageously on a milk ultrafiltration permeate, preferably supplemented with oligoelements and yeast extract, at a temperature of around 30° C. and in a strict anaerobic atmosphere ("GAS-PACK", $H_2+CO_2$ mixture ensuring anaerobic conditions). They may be preserved by freeze-drying and stored at preferably around 4° C.

By producing carbon dioxide, they help to saturate the aqueous part of the cheese with this gas.

The strains used are preferably those deposited in the Collection Nationale de Cultures de Microorganismes (C.N.C.M.) of the Institut Pasteur, Paris, under the nos. C.N.C.M. I-459, C.N.C.M. I-460 and C.N.C.M. I-461.

It has been found that these lactobacilli do not have the typical defects of butyric bacteria of the genus Clostridium due to the production of hydrogen which can lead to anarchic expansion of the body and to the formation of butyric acid responsible for a very unpleasant taste. By contrast, the formation of the holes is regular and no taste defect is introduced during ripening.

The level of seeding with revitalizable cells sufficient to produce regular opening is generally $5 \times 10^4$ to $1 \times 10^7$ and preferably $5 \times 10^4$ to $1 \times 10^5$ lactobacilli/ml milk. The action of the lactobacilli may of course be modulated by varying the seeding level. For example, ensilage milk or winter milk may contain a certain quantity of lactobacilli whereas summer milk does not contain any. Accordingly, it is preferable to add a larger quantity thereof to the summer milk. On the other hand, the appearance of the opening will also depend on that level and is generally between 15 and 30 days after production.

In one preferred embodiment of seeding, propionibacteria may be added to the lactobacilli in a quantity of $5\times10^5$ to $2\times10^4$ and preferably about $1\times10^4$ revitalizable cells/ml milk. It is assumed in effect that the lactobacilli enhance the anaerobiosis in the heart of the cheese and contribute to a better development of the propionibacteria. By varying the relative proportions of the lactobacilli and propionibacteria, it is possible more or less rapidly to make cheeses of comparable opening, but with a more or less pronounced sweet taste.

Other flavouring or colouring agents may also be added at this stage of the production process to provide the body with a desired taste or colour.

After seeding, acidification is left to take place, after which the matured milk is coagulated by addition of rennet, the curd is cut into grains, part of the serum is removed, the curd grains are washed with water to remove lactose, heated, placed in moulds and pressed in the moulds, after which the cheeses are removed from the moulds and salted, all these operations being carried out in the conventional manner and, of course, in accordance with the type of cheese which it is desired to make.

In one preferred embodiment of the process according to the invention, it is possible to make cheeses which are advantageously in the form of wheels preferably less than 110 mm in diameter and weighing less than 500 g. To this end, the cheese is coated with a plastics film substantially impermeable to gases before ripening so as to keep in most of the gases which form in the body during the ripening period. The expression "substantially impermeable to gases" designates a material capable of eliminating most of the losses of carbon dioxide and ensuring suitable imperviousness to oxygen.

It is possible to use a thermoformable material having a certain extensibility, i.e., capable of following the development of the shape of the cheese during opening of the body. Suitable materials are, for example, physiologically inert polyvinyl chloride (PVC), polyvinylidene chloride (PVDC), polyethylene (PE), polypropylene (PP), polyamide (PA). These materials may be in the form of copolymers or complexes or may serve as a plasticizing coating, for example, for a cellulosic film. It is preferred to use a plastic glue of food quality applied by brush-coating or steeping.

In one particular embodiment, it is possible to make cheeses of even smaller dimensions corresponding for example to a weight of less than 40 g. In this case, the product may advantageously be covered with a layer of paraffin and a plastics film of the type mentioned above.

In a variant of the preferred and particular embodiments described above, ripening may be carried out in a chamber in which an excess pressure of air or carbon dioxide, for example, of 25-30 mb in relation to atmospheric pressure, prevails in order to prevent the losses of gas formed in the body. The surrounding atmosphere may also be saturated with carbon dioxide to promote the growth of the propionibacteria by improving the anaerobiosis.

For uncoated cheeses, ripening may be carried out conventionally in accordance with the type of cheese which it is desired to make.

In the case of coated cheeses, ripening takes place in cellars where a temperature of approximately 15° C. and a relative humidity of approximately 90% prevail until openings are formed, and then in cold cellars, preferably at around 8° C., at approximately 90% relative humidity pending sale.

The invention is illustrated by the following Examples in which the parts and percentages are by weight unless otherwise indicated.

EXAMPLES

EXAMPLE 1

Whole winter milk is standardized if necessary with milk fats in the form of cream or with skimmed milk so that it contains 50% fats based on dry matter. The milk is then pasteurized for 15 s. at 72° C., cooled to 32° C. and then transferred to a vat.

The pasteurized and cooled milk is seeded with 1% of mesophilic lactic ferments, $10^4$ propionibacteria (revitalizable cells)/ml and $5\times10^4$ *Lactobacillus fermentum* C.N.C.M. I-459 (revitalizable cells)/ml. After 15 minutes, the milk has a pH of 6.5 (17° Dornic). Its temperature is adjusted to 32° C. and 40 ml of 1/10000 rennet are added per 100 l milk. After 22 minutes, the curd is cut and stirred to obtain pieces having the size of a grain of corn, the cutting lasting 20 mins. A quantity of serum corresponding to 50% of the milk used is then removed and water is introduced in a quantity of 20% of the milk used. The dispersion is progressively heated from 32° C. to 37.5° C. with stirring in 15 minutes and is then kept at that temperature for 3 minutes. The grains of curd are then transferred to moulds, avoiding moulding holes in the body by entrapment of air and the formation of mechanical opening, and are pressed therein by applying a pressure increasing progressively from 20 mb to 60 mb. The cheeses are then removed from the moulds and salted.

Finally, they are coated with a 2 mm layer of plastic glue ("FOODPLAST") and then ripened in a cellar where a temperature of 8° C. and a relative humidity of 90% prevail. The opening appears after 20 to 30 days. The cheeses are then stored for 10 days in a cellar in which the temperature is 8° C. and the relative humidity 90%. The cheeses obtained have a regular opening and a characteristic sweet taste. They have a diameter of 105 mm and weight 450 g.

EXAMPLES 2-3

The procedure is as in Example 1 using summer milk seeded with the strains *Lactobacillus fermentum* C.N.C.M. I-460 (Example 2) and C.N.C.M. I-461 (Example 3) in a quantity of $10^6$ lactobacilli (revitalizable cells)/ml. The cheeses obtained have a slightly sweet taste and a regular opening appearing after 15 to 20 days' ripening.

EXAMPLE 4

The procedure is as in Example 1 using the strain *Lactobacillus fermentum* C.N.C.M. I-459 in a quantity of $10^7$ lactobacilli (revitalizable cells)/ml, but without adding propionibacteria. The opening of the body appears after 15 days' ripening. The end products have a regular opening and a neutral taste.

Comparison Examples

Attempts were made to make a non-cooked pressed curd cheese in the form of 150 mm diameter wheels by a process similar to that described in Example 1, but without introducing lactobacilli.

1. From summer milk for which the opening of the body did not appear despite coating of the cheese with a shell impermeable to gases before ripening, technological and microbiological modifications were made.

1a. The pasteurization scheme between 63° and 90° C. was modified.

1b. The addition of 1/10000 rennet was increased to 45 ml for 100 l milk.

1c. Lactose removal was increased by washing the curd grains several times after removal of the serum or, by contrast, washing was omitted to reduce lactose removal.

1d. The pressing temperature was varied from 20° C. to 32° C.

1e. The quantity of propionibacteria was increased to $2\times 10^6$ bacteria (revitalizable cells)/ml.

1f. The nature of the propionibacteria was varied for the seeding level of Example 1 using bacteria of various origins or strains precultured in the laboratory.

1g. The crude milk was matured to multiply the wild ferments in the starting milk.

1h. The milk was seeded with yeasts to a level of $10^5$ revitalizable cells/ml.

1i. The milk was seeded with a mixture of yeasts and bacteria of the species *Leuconostoc citrovorum* to a level of $10^5$ to $10^6$ revitalizable cells/ml.

1j. The milk was seeded with bacteria of the species *Lactobacillus helveticus* in a quantity of 1%.

These various approaches failed to produce opening of the body with the exception of test 1i which produced slight but inadequate opening.

2. Winter milks are characterized by the presence of butyric bacteria. Depending on their number, these bacteria can assist the opening of the cheeses or, on the contrary, can cause defective expansion and taste and anarchic opening of the body by massive production of $H_2$ and $H_2S$. An attempt was made to cause the opening of the body by using winter milks.

2a. To keep the gas in the product, the cheeses were coated with a thermoformed film of polyvinyl chloride (PVC)/polypropylene (PP) 400 μm thick over 90% of their surface. A plug of wax occupied the remaining 10% of the surface and acted as a valve in the event of an increase in volume.

The cheeses thus treated were compared with uncoated control cheeses. After ripening for 25 days, the control cheeses remained blind (without openings) while the coated cheeses were open but highly deformed.

2b. The seeding level of propionibacteria was increased to $10^6$ revitalizable cells/ml, but without coating the cheeses. This measure did not produce the desired opening. This shows that there is no correlation between these bacteria and the formation of the opening because a high population is not sufficient for that purpose. However, in the absence, of lactobacilli but in the presence of a coating, the openings can only form in cheeses having a large population of propionic and/or butyric bacteria.

EXAMPLE 5

Following the procedure of Example 1, cheeses weighing 32 g are made by completely covering them with a layer of wax (paraffin) and then coating them with a plastic film ("FOODPLAST").

The body shows a regular opening after 28 days.

EXAMPLE 6

The procedure is as in Example 5, except that the cheeses are neither covered with paraffin wax nor coated, but instead are ripened in a chamber in which prevail and excess pressure of 25 mb of carbon dioxide in relation to atmospheric pressure and a relative humidity of 90%.

The body shows a regular opening after 20 days.

EXAMPLE 7

Milk containing 50% fats based on dry matter is bactofuged at 65° C. to eliminate the butyric spores. Thereafter, Emmental is made in the usual way except that the bactofuged milk is seeded with 1% of thermophilic lactic ferments and adding $10^4$ propionibacteria (revitalizable cells)/ml and $10^3$ lactobacilli (revitalizable cells)/ml and the cheeses are ripened in the usual way.

All the cheeses have regular and developed openings and a perfectly characteristic aroma.

Comparison Example

Emmental is made in the usual way using milk of which part is crude, i.e., neither bactofuged nor pasteurized.

After ripening, some cheeses show expansion defects and/or have an unacceptable butyric taste resulting in their rejection.

We claim:

1. In a process for preparing bodies of ripened pressed curd cheeses having openings in the bodies wherein pasteurized milk standardized in milk fats is seeded with lactic ferments and seeded with rennet for producing a serum and a curd which is cut into grains, wherein part of the serum is separated from the curd grains which are then washed, heated, placed in molds and pressed, and wherein pressed molded bodies of cheese are removed from the molds, salted and ripened, the improvement comprising seeding the milk with lactobacilli of the species *Lactobacillus fermentum*, before seeding with the rennet, in a quantity sufficient for producing openings in the pressed molded bodies of the cheese during ripening.

2. A process according to claim 1 wherein the *Lactobacillus fermentum* are strains selected from the group consisting of C.N.C.M. I-459, C.N.C.M. I-460 and C.N.C.M. I-461.

3. A process according to claim 1 or 2 wherein the milk is seeded with a quantity of from $5\times 10^4$ to $1\times 10^7$ *Lactobacillus fermentum* cells per ml milk.

4. A process according to claim 1 or 2 further comprising seeding the milk with propionibacteria in a quantity of from $1\times 10^4$ to $5\times 10^5$ cells per ml milk before renneting.

5. A process according to claim 1 or 2 further comprising culturing the *Lactobacillus fermentum* on a medium selected from the group consisting of MRS-BOUILLON and milk ultrafiltration permeate.

6. A process according to claim 1 or 2 further comprising coating the pressed molded bodies of the cheese with a plastic film which is substantially impermeable to gases for ripening the cheese.

7. A process according to claim 6 further comprising coating the pressed molded bodies of the cheese with a layer of paraffin and then coating the paraffin coated cheese with the plastic film for ripening the cheese.

8. A process according to claim 1 or 2 further comprising ripening the cheese in a chamber under a pressure in excess of atmospheric pressure sufficient for preventing loss of gas from the bodies of the cheese during ripening.

9. A process according to claim 8 wherein the chamber contains a gas selected from the group consisting of carbon dioxide, air and air saturated with carbon dioxide.

* * * * *

UNITED STATES PATENT AND TRADEMARK OFFICE
CERTIFICATE OF CORRECTION

PATENT NO. : 4,770,882

DATED : September 13, 1988

INVENTOR(S) : Jean-Claude INGOUF, et al.

It is certified that error appears in the above-identified patent and that said Letters Patent is hereby corrected as shown below:

Column 2, line 38, insert quotation marks around --MRS-BOUILLON--.

Column 2, line 53, "defeats" should be --defects--.

Column 2, lines 53-54, "Clostridium" should be italicized

Column 5, line 53, after "absence" delete the comma.

Column 6, line 55, [line 4 of claim 6], "cheese" should b --cheeses--.

All occurrences of "C.", except where "C." falls at the end of a sentence, should be --C--.

Signed and Sealed this

Thirty-first Day of January, 1989

Attest:

DONALD J. QUIGG

Attesting Officer      Commissioner of Patents and Trademarks